United States Patent [19]
Falcon-Steward

[11] 3,989,195
[45] Nov. 2, 1976

[54] PRODUCTION OF AQUEOUS CALCIUM CARBONATE SUSPENSIONS

[75] Inventor: Hugh Robin Falcon-Steward, St. Austell, England

[73] Assignee: English Clays Lovering Pochin & Company Limited, England

[22] Filed: Dec. 15, 1975

[21] Appl. No.: 640,699

[30] Foreign Application Priority Data

Jan. 3, 1975 United Kingdom .................. 308/75

[52] U.S. Cl. .................................. 241/16; 106/306
[51] Int. Cl.$^2$ .......................................... B02C 28/00
[58] Field of Search .................. 241/15, 16, 20, 21; 423/161, 173, 430; 302/66; 106/306

[56] References Cited

UNITED STATES PATENTS

| | | | |
|---|---|---|---|
| 3,598,624 | 8/1971 | Kaufman | 241/16 |
| 3,604,634 | 9/1971 | Windle | 241/16 |
| 3,797,610 | 3/1974 | Windle | 106/306 |
| 3,920,800 | 11/1975 | Harris | 423/161 |

*Primary Examiner*—Granville Y. Custer, Jr.
*Attorney, Agent, or Firm*—Larson, Taylor and Hinds

[57] ABSTRACT

A method of producing an easily pumpable aqueous suspension of a natural calcium carbonate material containing at least 60% by weight of particles smaller than 2 microns equivalent spherical diameter comprises forming an aqueous suspension of said natural calcium carbonate material and a minor amount of a compound which contains calcium ions or carbonate ions and has a solubility in water of at least 0.05 g per 100 ml of water at 25° C; and thereafter deflocculating the natural calcium carbonate material in said aqueous suspension with a dispersing agent.

6 Claims, No Drawings

PRODUCTION OF AQUEOUS CALCIUM CARBONATE SUSPENSIONS

BACKGROUND OF THE INVENTION

This invention relates to the production of aqueous suspensions of a natural calcium carbonate.

It is advantageous for some users of fine calcium carbonate materials, especially for paper manufacturers who use such materials as a pigment in paper coating compositions, to receive the material in the form of a deflocculated aqueous suspension since this obviates the need to provide special high power mixing equipment and to consume large quantities of energy. However, if transport of calcium carbonate materials in this manner is to be economically viable the quantity of water mixed with the material should be as small as possible and yet the suspension should be sufficiently fluid to be pumped easily, should not increase in viscosity substantially over a period of several weeks and should not sediment solid particles.

In British Patent Specification No. 1,204,511 there is described a method of producing a suitable aqueous suspension. In this known method calcium carbonate of the required particle size distribution is prepared by a particle size separation technique, for example in a centrifuge, and in the presence of a dispersing, or deflocculating, agent. The deflocculated aqueous suspension of fine calcium carbonate is then flocculated and the flocculated suspension dewatered in, for example, a filter press. The filter cakes are then mixed with a dispersing agent having an organic polymeric anion in a high shear mixer for a time sufficient to dissipate in the resulting slurry at least 5 horsepower hours of energy per ton (13.2. $KJKg^{-1}$) of dry calcium carbonate. This known method provides an aqueous suspension with good properties for transportation but has the disadvantage that dispersing agents of the type described are expensive and a certain minimum quantity of dispersing agent must be added to secure adequate fluidity and stability.

In British Patent Specification No. 1,215,576 there is described a method of producing an aqueous suspension of a calcium carbonate mineral which is suitable for transportation; in this method a calcium carbonate mineral is mixed with a dispersing agent and with sufficient water to give a solids content in the range which is required for the final suspension, generally from 70% to 85% by weight of solids, and is then ground with a particulate grinding medium for a time sufficient to produce the required particle size distribution in the calcium carbonate mineral. This method has the disadvantage that the solids content which is required for the final suspension is unlikely to be the solids content at which the grinding process is most efficient and a considerable amount of energy may therefore be wasted in the grinding operation.

SUMMARY OF THE INVENTION

According to the present invention there is provided a method of producing an easily pumpable aqueous suspension of a natural calcium carbonate material containing at least 60% by weight of particles smaller than 2 microns equivalent spherical diameter, which method comprises the steps of:

a. forming an aqueous suspension of natural calcium carbonate material containing 60% by weight of particles smaller than 2 microns equivalent spherical diameter and a minor amount of a compound which contains calcium ions or carbonate ions and has a solubility in water of at least 0.05 g per 100 ml of water at 25° C; and thereafter b. deflocculating the natural calcium carbonate material in said aqueous suspension with a dispersing agent.

The natural calcium carbonate material may be, for example, a chalk, a limestone, a marble or a dolomite, or the shells or skeletons of marine animals, such as oyster shells and certain corals. The present invention has been found to give especially good results with natural chalks.

DESCRIPTION OF PREFERRED EMBODIMENTS

The minor amount of the calcium ion or carbonate ion-containing compound incorporated in the aqueous suspension of the calcium carbonate material is preferably in the range of from 0.001% to 0.5% by weight based on the weight of dry calcium carbonate. The calcium ion- or carbonate ion-containing compound may be, for example, calcium hydroxide, calcium chloride or sodium carbonate.

In step (b) of the method of the invention the dispersing agent is preferably a water-soluble salt of a poly(acrylic acid) or a poly(methacrylic acid); a water-soluble copolymer or water-soluble copolymer derivative of the type described in British Patent Specification No. 1,414,964; a water-soluble condensed phosphate; or a water-soluble salt of a poly(silicic acid). The quantity of dispersing agent required will generally lie in the range from 0.05 to 0.5% by weight, based on the weight of dry calcium carbonate.

The calcium ion- or carbonate ion-containing compound is advantageously incorporated in the aqueous suspension of natural calcium carbonate material by adding it to the calcium carbonate material during a wet process for the comminution of the calcium carbonate material. Thus, in one embodiment of the invention the natural calcium carbonate material is comminuted by agitating an aqueous suspension thereof containing (i) from 10% to 60% by weight of the natural calcium carbonate, (ii) a compound containing calcium ions of carbonate ions and having a solubility of at least 0.05 g per 100 ml of water at 25° C, and (iii) a particulate grinding medium which comprises particles having a diameter not greater than 100 mm and not smaller than 0.15 mm. The aqueous suspension of the calcium carbonate material which is to be comminuted preferably contains from 20% to 50% by weight of calcium carbonate. The preferred size of the particulate grinding medium depends upon the initial particle size of the calcium carbonate material but it is advantageous if the particles of the grinding medium are all of approximately the same size. If the starting material contains a substantial proportion of particles having a diameter greater than 50 microns it is preferred to subject the aqueous suspension of natural calcium carbonate to a first grinding step using balls or pebbles having diameters in the range from 25 mm to 100 mm followed by a second grinding step using, for example, particles of sand, glass or ceramic material, having diameters in the range from 0.15 mm to 10 mm. If the starting material consists predominantly of particles smaller than 50 microns one grinding step is sufficient using a particulate grinding medium having particles of diameter in the range from 0.15 mm to 10 mm. After the comminution process the aqueous suspension of the calcium carbonate material is separated from the particulate grinding material and is then preferably substantially dewatered, for example by filtering to form a filter cake. Thereafter it is mixed with the dispersing agent in a mixer which is capable of exerting high shearing forces. The aqueous suspension of the comminuted calcium carbonate material is preferably dewatered by filtering under a pressure in the range of 100 psig to 200 psig (690 $KNm^{-2}$ – 13.8 $MNm^{-2}$) to produce a filter cake which advantageously has a solids content in the range from 65% to 80% by weight. An additional advantage of this embodiment of the method of the invention is that less energy is required to provide a given grinding effect at a low solids content than at the more conventional higher solids contents. In addition the greater proportion of water present during the comminution process means that the thermal capacity of the system is increased and therefore temperature rises occurring during comminution are much less than those found with the known processes. This means that the impeller and interior walls of the grinding apparatus used can be covered with a wear resistant material, such as a polyurethane elastomer, which has excellent resistance to abrasion but begins to be degraded when the temperature of the suspension in the grinding mill rises above about 50° – 70° C.

Although it is generally advantageous to incorporate the calcium ion- or carbonate ion-containing compound in the aqueous suspension of the calcium carbonate material during a wet comminution process as described above, it can be incorporated in the natural calcium carbonate material after the latter has been comminuted. For example, it can be added after a grinding process has been carried out but before dewatering by filtration or it can be added by mixing it with the dewatered filter cake in apparatus suitable for handling a plastic mass, e.g. an auger-type pugmill, a Z-blade mixer or an edge runner mill.

This invention is illustrated by the following Examples:

EXAMPLE 1

Samples of a conventionally refined Wiltshire chalk having a particle size distribution such that 35% by weight consisted of particles smaller than 2 microns equivalent spherical diameter were mixed with water to form an aqueous suspension containing 25% by weight of chalk. To all but one sample there was added a quantity of calcium hydroxide, calcium chloride or sodium carbonate. The resultant aqueous suspensions were each admixed with a grinding medium which consisted of Leighton Buzzard sand having particles ranging in diameter from 0.5 mm to 1.0 mm and ground for a time such that the amount of energy dissipated in the suspension in each case was equal to 70 horsepower hours of energy per ton of dry chalk (186 $KJKg^{-1}$).

After grinding, the aqueous suspensions were filtered and the filter cake was mixed with 0.2% by weight, based on the weight of dry chalk, of a sodium polyacrylate dispersing agent having a number average molecular weight of 1650 in a high speed mixer which was provided with a propeller type impeller. In each case the degree of deflocculation was observed visually. For example the suspension was considered to be inadequately deflocculated if clear water could be seen at the upper surface of the suspension after standing for a few minutes. If a suspension was correctly deflocculated the fine particles remained uniformly dispersed in the suspension.

For each sample of ground deflocculated chalk the proportion by weight of particles having an equivalent spherical diameter smaller than 2 microns was measured and the degree of deflocculation was observed visually.

The results are set forth in Table I below.

TABLE I

| Water-Soluble compound | Amount water-soluble compound added (% by wt.) | % by wt. smaller than two microns | Degree of deflocculation |
|---|---|---|---|
| — | — | 74 | Unsatisfactory |
| $Ca(OH)_2$ | 0.3 | 73 | Very Good |
| " | 0.15 | 74 | Very Good |
| $CaCl_2$ | 0.005 | 76 | Good |
| $Na_2CO_3$ | 0.005 | 72 | Good |

EXAMPLE 2

Two samples of the chalk described in Example 1 were ground in aqueous suspension at a solids content of 45% by weight in a sand grinding vessel using as the grinding medium Leighton Buzzrd sand having particles with diameters ranging from 0.5 mm to 1.0 mm. Each sample was ground for a time sufficient to dissipate in the suspension 120 horsepower hours of energy per ton of dry chalk (317 $KJKg^{-1}$), the first sample being ground in suspension in tap water alone and the second sample being ground in tap water containing 0.3% by weight of calcium hydroxide based on the weight of dry chalk.

The ground products in each case were filtered and portions of the filter cake were mixed with (a) sufficient water to adjust the solids content to 70% by weight, and (b) 0.3% by weight, based on the weight of dry chalk, of either sodium hexametaphosphate or the sodium polyacrylate dispersing agent described in Example 1. Viscosity measurements of the resulting deflocculated suspension were made by means of a Brookfield Viscometer using Spindle No. 2 at a speed of 100 rpm. The portions which had been ground in the absence of calcium hydroxide had the higher initial viscosity and were also so unstable that the viscosity increased noticeably while the measurement was being made. On the other hand, the portions which had been ground in the presence of calcium hydroxide were more fluid and showed little increase in viscosity over a period of about 500 hours.

The deflocculated suspensions of the portions which had been ground in the presence of calcium hydroxide were so fluid at 70% by weight of solids that some sedimentation of solids occurred. This is undesirable if the material is to be transported in slurry form and there was therefore added to the deflocculated suspensions a further portion of the filter cake (obtained by filtering the suspension which had been ground in the presence of calcium hydroxide) mixed with sufficient water to adjust the solids content to 70% by weight so as to produce a final deflocculated suspension containing 0.1% by weight, based on the weight of dry chalk, of the sodium polyacrylate dispersing agent. The resultant slurry was more viscous although still very stable and showed no sedimentation.

The results obtained are set forth in Table II below:

TABLE II

| % by weight of $Ca(OH)_2$ | Deflocculant added after filtration | % by weight of deflocculant | time (hrs) | viscosity (centipoise) |
|---|---|---|---|---|
| 0 | Sodium hexametaphosphate | 0.3 | 0 | 268–311 |
| 0 | Sodium polyacrylate | 0.3 | 0 | 223–282 |
| 0.3 | Sodium hexametaphosphate | 0.3 | 0 | 68 |
| | | | 17 | 65 |
| | | | 42 | 64 |
| | | | 137 | 69 |
| | | | 168 | 72 |
| | | | 480 | 90 |
| 0.3 | Sodium polyacrylate | 0.3 | 0 | 81 |
| | | | 25 | 76 |
| | | | 120 | 74 |
| | | | 168 | 78 |
| | | | 504 | 68 |
| 0.3 | Sodium polyacrylate | 0.1 | 0 | 155 |
| | | | 26 | 158 |
| | | | 270 | 166 |
| | | | 672 | 163 |

EXAMPLE 3

Two batches of Wiltshire chalk which had an initial particle size distribution such that 39% by weight consisted of particles smaller than 2 microns equivalent spherical diameter and 16% by weight of particles larger than 10 microns equivalent spherical diameter were ground in a sand grinding vessel using as the grinding medium Leighton Buzzard sand having particles of diameter ranging from 0.5 mm to 1.0 mm. The first batch was mixed with sufficient water to give a solids content of 30% by weight and with 0.3% by weight of calcium hydroxide based on the weight of dry chalk, and the second batch was mixed with sufficient water to give a solids content of 70% by weight and with 0.3% by weight, based on the weight of dry chalk of the same sodium polyacrylate dispersing agent as was used in Example 1.

Samples of each batch were ground for times such that there were dissipated in the suspensions 60, 80, 100 and 120 horsepower hours of energy respectively per ton of dry chalk (i.e. 159, 212, 264 and 317 $KJKg^{-1}$). The percentage by weight of particles having an equivalent spherical diameter smaller than 2 microns and the percentage by weight having an equivalent spherical diameter larger than 10 microns were determined for each of the ground samples and the results are set forth in Table III below.

TABLE III

| Energy dissipated (hp - hr per ton) | % by wt. larger than 10 microns: 30% solids with $Ca(OH)_2$ | % by wt. larger than 10 microns: 70% solids and deflocculated | % by wt. smaller than 2 microns: 30% solids with $Ca(OH)_2$ | % by wt. smaller than 2 microns: 70% solids and deflocculated |
|---|---|---|---|---|
| 0 | 16 | 16 | 39 | 39 |
| 60 | 1 | 4 | 73 | 60 |
| 80 | 0.8 | 2 | 81 | 65 |
| 100 | 0.8 | 2 | 91 | 68 |
| 120 | 0.8 | 2 | 98 | 71 |

These results show that considerably less energy is required to grind the chalk to a given degree of fineness when the chalk is ground in an aqueous suspension containing 30% by weight of solids and in the presence of calcium hydroxide.

All the samples of chalk which had been ground at 30% by weight of solids and in the presence of calcium hydroxide were suitable for forming a stable, deflocculated aqueous suspension by filtering the flocculated suspension and mixing the resulting filter cake with a dispersing agent.

EXAMPLE 4

A sample of marble chips from Carrara, Italy was found to have the particle size analysis shown in Table IV below:

TABLE IV

| Nominal aperture of sieve (mm) | % by weight passing sieve |
|---|---|
| 6.25 | 100 |
| 4.75 | 99 |
| 3.15 | 58 |
| 2.00 | 21 |
| 1.00 | 17 |
| 0.50 | 15 |
| 0.25 | 10 |
| 0.15 | 5 |
| 0.10 | 2 |

8 Kg of the marble chips were mixed with water containing 0.3% by weight of calcium hydroxide based on the weight of dry marble chips, the solids content of the aqueous slurry being 40% by weight. The aqueous slurry was ground in a peble mill with flint pebbles having diameters in the range from 25 to 38 mm and it was found that after grinding for 2 hours the particle size distribution of the ground marble was such that only 0.83% by weight of the particles had a diameter greater than 53 microns. The rate of production of marble ground to this fineness was 4 Kg per hour.

A second sample of marble chips from the same source had the particle size analysis shown in Table V below:

TABLE V

| Nominal aperture of sieve (mm) | % by weight passing sieve |
|---|---|
| 0.42 | 97 |
| 0.30 | 92 |
| 0.18 | 69 |
| 0.15 | 60 |
| 0.11 | 44 |

TABLE V-continued

| Nominal aperture of sieve (mm) | % by weight passing sieve |
|---|---|
| 0.05 | 25 |

22.7 Kg of the marble chips were mixed with water containing 0.3% by weight of the sodium polyacrylate dispersing agent described in Example 1, based on the weight of dry marble chips, the solids content of the aqueous slurry being 71.4% by weight. The aqueous slurry was ground in the same pebble mill and with the same pebbles as described above and it was found that after grinding for 5 hours the particle size distribution was approximately the same as that achieved with the first batch as described above. The rate of production of marble ground to this degree of fineness was 4.54 Kg per hour and although this rate of production was slightly higher than that achieved with the first sample the starting material in the case of the first sample was very much coarser and the grinding efficiency is therefore seen to be superior in the case of the first sample.

The product of the first sample was ground further with Leighton Buzzard sand having particles of diameter ranging from 0.5 mm to 1.0 mm, additional water being added to the slurry to reduce the solids content to 25% by weight.

The diluted slurry was ground for a time sufficient to dissipate in the suspension 209 horsepower hours of energy per ton of dry marble (553 $KJKg^{-1}$). The resultant produce had a particle size distribution such that 84% by weight consisted of particles having an equivalent spherical diameter smaller than 2 microns and 4% by weight of particles having an equivalent spherical diameter larger than 10 microns.

The suspension of finely ground product was filter pressed and the cake was redispersed in water containing 0.3% by weight, based on the weight of dry marble, of the same sodium polyacrylate dispersing agent as was used in Example 1, to form an aqueous suspension which was very fluid and had good rheological stability at a solids content of 70% by weight.

EXAMPLE 5

A sample of crude chalk from the Paris Basin, France was comminuted by crushing and ball milling until 20% by weight consisted of particles having an equivalent spherical diameter smaller than 2 microns. 380g of the comminuted chalk were mixed with sufficient tap water to form a suspension containing 30% by weight of dry chalk and the resultant suspension was ground with 2.5 Kg of a grinding medium which consisted of Leighton Buzzard sand consisting of particles with diameters ranging from 0.5 mm to 1.0 mm. The duration of the grinding was such that 105 horsepower hours of energy per ton of dry chalk (278 $KJKg^{-1}$) were dissipated in the suspension. Sufficient calcium hydroxide was then mixed with the comminuted suspension to provide 0.3% by weight of calcium hydroxide based on the weight of dry chalk. The resultant suspension was then dewatered by filtration, the solids content of the cake was adjusted to 70% by weight and the cake was deflocculated with 0.3% by weight, based on the weight of dry chalk, of the sodium polyacrylate dispersing agent. The viscosity of the deflocculated suspension was 80 centipoise which can be seen to be very similar to the result shown in Table II for the same additions of calcium hydroxide and sodium polyacrylate, the calcium hydroxide being added before the grinding step.

EXAMPLE 6

Samples of the same chalk as was used in Example 5, after comminution by crushing and ball milling until 20% by weight consisted of particles having an equivalent spherical diameter smaller than 2 microns, were mixed with water to form suspensions containing 30% by weight of dry chalk. A different amount of calcium hydroxide was added to each suspension and each suspension was ground with the same grinding medium as in Example 5, 105 horsepower hours of energy per ton of dry chalk (278 $KJKg^{-1}$) being dissipated in each suspension. Each suspension was then dewatered by filtration and the solids content of the cake was adjusted to 70% by weight. The amount of sodium polyacrylate required to give minimum viscosity of the deflocculated suspension was found by adding to each sample of filter cake small increments of an aqueous solution containing 45.7% by weight of the sodium polyacrylate and measuring the viscosity of the suspension after each increment by means of a Brookfield Viscometer using Spindle No. 2 at a speed of 100 rpm. The minimum viscosity and the corresponding amount of sodium polyacrylate for each amount of calcium hydroxide are shown in Table VI below:

TABLE VI

| % by weight of $Ca(OH)_2$ | minimum viscosity (centipoise) | % by weight of sodium polyacrylate |
|---|---|---|
| 0 | 590 | 0.065 |
| 0.1 | 239 | 0.08 |
| 0.2 | 146 | 0.10 |
| 0.3 | 75 | 0.15 |
| 0.4 | 84 | 0.25 |
| 0.6 | 79 | 0.23 |
| 0.8 | 80 | 0.34 |

These results show that there is no advantage in adding more than 0.3% by weight of calcium hydroxide because no further decrease in viscosity is achieved and a greater quantity of sodium polyacrylate dispersing agent must be added to obtain the minimum viscosity.

I claim:

1. In a method of producing an easily pumpable aqueous suspension of a natural calcium carbonate material containing at least 60% by weight of particles smaller than 2 microns equivalent spherical diameter, the improvement which comprises the steps of:

a. forming an aqueous suspension of natural calcium carbonate material containing 60% by weight of particles smaller than 2 microns equivalent spherical diameter and a minor amount of a compound which contains calcium ions or carbonate ions and has a solubility in water of at least 0.05 g per 100 ml of water at 25° C; and thereafter b. deflocculating the natural calcium carbonate material in said aqueous suspension with a dispersing agent.

2. A method according to claim 1, wherein said natural calcium carbonate is a chalk.

3. A method according to claim 1 wherein said aqueous suspension of natural calcium carbonate material which is formed in step (a) contains from 0.001% to 0.5% by weight, based on the weight of dry calcium carbonate, of said calcium ion- or carbonate ion-containing compound.

4. A method according to claim 3 wherein said calcium ion- or carbonate ion-containing compound is calcium hydroxide, calcium chloride or sodium carbonate.

5. A method according to claim 1, wherein step (a) is effected by comminuting a natural calcium carbonate by agitating an aqueous suspension thereof containing (i) from 10% to 60% by weight of the natural calcium carbonate, (ii) a compound containing calcium ions or carbonate ions and having a solubility of at least 0.05g per 100 ml of water at 25° C and (iii) a particulate grinding medium which comprises particles having a diameter not greater than 100 mm and not smaller than 0.15 mm.

6. A method according to claim 5, wherein said aqueous suspension of natural calcium carbonate material which is formed in step (a) contains from 0.001% to 0.5% by weight, based on the weight of dry calcium carbonate, of at least one of calcium hydroxide, calcium chloride and sodium carbonate.

* * * * *